United States Patent [19]

Bernelin et al.

[11] 4,371,638

[45] Feb. 1, 1983

[54] BINDER COMPOSITIONS FOR POWDER COATINGS FROM MIXED SATURATED RESINS

[75] Inventors: Daniel Bernelin, Ris Orangis; Jacques Meyer, Paris, both of France

[73] Assignee: Rhone-Poulenc Industries, Paris, France

[21] Appl. No.: 294,521

[22] Filed: Aug. 20, 1981

Related U.S. Application Data

[63] Continuation of Ser. No. 12,020, Feb. 14, 1979, abandoned.

[30] Foreign Application Priority Data

Feb. 20, 1978 [FR] France .............................. 78 04685

[51] Int. Cl.³ ...................... C08L 67/02; C08L 63/00; C08L 63/02
[52] U.S. Cl. .................................. 523/427; 524/539; 523/400; 525/438; 525/444; 525/524
[58] Field of Search ...................... 525/438, 444, 524; 524/539; 523/427

[56] References Cited

U.S. PATENT DOCUMENTS

| | | | |
|---|---|---|---|
| 3,699,187 | 10/1972 | Gardziella | 525/444 |
| 3,723,572 | 3/1973 | Reese et al. | 525/444 |
| 3,842,035 | 10/1974 | Klaren | 525/444 |
| 3,989,766 | 11/1976 | Nishizaki et al. | 525/524 |
| 4,024,111 | 5/1977 | Thomas et al. | 525/444 |
| 4,032,593 | 6/1977 | Samejima | 525/438 |

Primary Examiner—Carman J. Seccuro
Attorney, Agent, or Firm—Burns, Doane, Swecker and Mathis

[57] ABSTRACT

A saturated, cross-linking binder composition for use in powder coatings is disclosed. The composition comprises at least two saturated cross-linking resins and a cross-linking agent in which the resins exhibit different reactivities with respect to the cross-linking agent.

31 Claims, 1 Drawing Figure

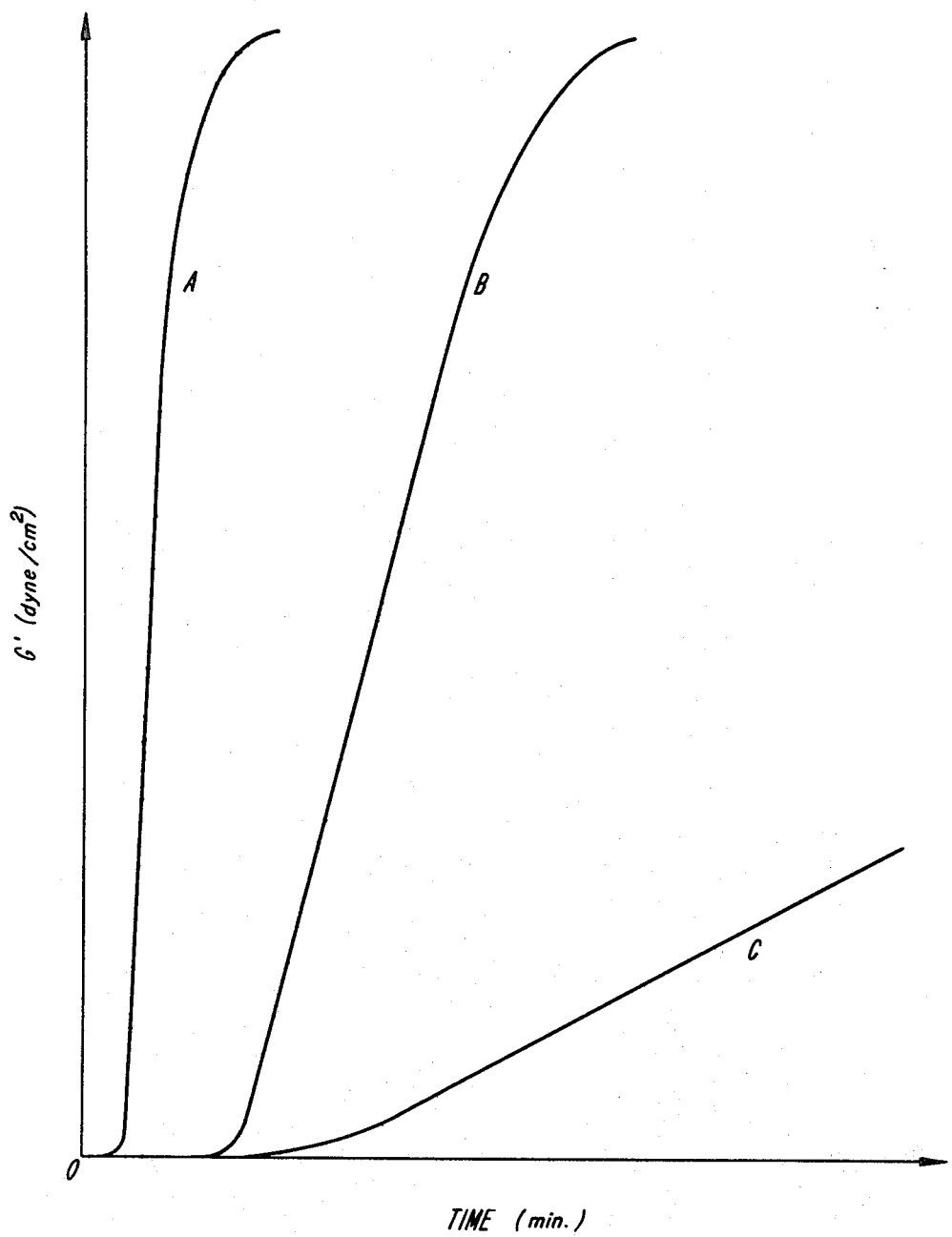

BINDER COMPOSITIONS FOR POWDER COATINGS FROM MIXED SATURATED RESINS

This application is a continuation, of application Ser. No. 012,020, filed Feb. 14, 1979 now abandoned.

BACKGROUND OF THE INVENTION

1. Field of the Invention

The present invention is directed to saturated, cross-linking compositions and a process for their preparation and more particularly, to compositions useful as binders for powder coatings which produce a coating film with a mat and/or satin surface.

2. Description of the Prior Art

It is known in the coatings industry that saturated compositions in the powder form may be used as coatings. Such compositions require a binder which consists of a reactive resin associated with a cross-linking agent and possibly other well known additives, such as fillers, pigments, etc. These compositions generally produce, after fusion and cross-linking, smooth and glossy coatings with high mechanical and chemical properties. However, recently there has been increasing demands in the coatings industry for compositions capable of producing, after curing, non-glossy, mat and/or satin surfaces. One known process for achieving such a result generally comprises the inclusion in the composition of at least one mineral filler having a grain size distribution chosen to achieve the effect desired. These fillers are included in addition to the conventional pigmented fillers. Unfortunately, this process exhibits a number of major disadvantages, including a high filler content which is detrimental to satisfactory spreading of the binder and capable of causing a lack of cohesion in the coating film, poor mechanical properties, pronounced defects of adherence, and mediocre resistance to solvents and aging.

German Pat. No. 2,351,176 describes a powder coating composition based on a saturated, thermoplastic polyester resin containing cellulose ester particles intended to yield, upon fusion, coatings exhibiting mat and textured surfaces. This composition, however, is not cross-linked, and requires elevated curing temperatures. Moreover, due to the high cellulose ester content, the resulting coating is quite susceptible to degradation by conventional solvents. Accordingly, there exists a need in the art for compositions useful as binders for powder coatings which produce cross-linked coatings with non-glossy surfaces without the disadvantages and inadequacies of presently available compositions.

SUMMARY OF THE INVENTION

Accordingly, it is an object of the present invention to provide powder compositions which cross-link at temperatures not in excess of about 220° C., resulting in cross-linked coatings having non-glossy surfaces, excellent resistance to solvents, atmospheric agents and ultraviolet radiation, and good bending, impact and drawing strengths.

Other objects and advantages will be evident to those of skill in the art upon reviewing the detailed disclosure herein.

The foregoing objects and advantages are provided by a binder comparison for use in powder coatings comprising at least two saturated cross-linking resins exhibiting different reactivities with respect to the same cross-linking agent, and the cross-linking agent. The use of this binder composition yields cross-linked coatings having a non-glossy surface.

BRIEF DESCRIPTION OF THE DRAWING

The FIGURE of Drawing presents graphically reactivities of three binder compositions in terms of elastic modulus versus time.

DETAILED DESCRIPTION OF THE INVENTION

According to the present invention, the saturated cross-linking resins comprise resins selected from the group consisting of saturated polyester resins and epoxy resins. The polyesters of the compositions are known products, prepared according to known processes via the reaction of an aromatic dicarboxylic acid or lower alkyl esters thereof, with a diol, in proportions selected in accordance with the indices of the acid and the hydroxyl content desired in the resin. Preferred aromatic dicarboxylic acids include isophthalic and terephthalic acids alone, in mixtures or in combination with saturated, aliphatic dicarboxylic acids, such as adipic or sebacic acids. Furthermore, saturated polyacids having a functionality greater than two may be associated with the dicarboxylic acids in order to partially branch the polyester, without rendering it non-fusible. Exemplary of acids with functionalities higher than two are the trimellitic, pyrimellitic, butane tetracarboxylic acids or anhydrides. The diols which may be employed to obtain the polyester include: ethylene glycol, propylene glycol, diols with an ether bridge such as diethylene glycol and dipropylene glycol, butane diols, bisphenol A dihydroxydiethylether, hydrogenated bisphenol A, neopentyl glycol. The diols may be used alone or in mixtures. Moreover, these diols may be associated with polyols having functionalities greater than two such as glycerol, trimethylolpropane, trihydroxyethylisocyanide, pentaerythritol. The proportion of the polyacid or polyol whose functionality exceeds two must be such that it will not result in a premature cross-linking which would cause non-fusibility of the polyester during preparation. The maximum proportions of the monomer having more than two functions is defined by Flory's Law as a function of the progress of the reaction, as described in detail in T. Alfrey, "Mechanical Behavior of High Polymers", Interscience Publishers, Vol. VI., p. 268, the disclosure of which is hereby incorporated by reference.

Generally, the saturated polyesters used in the binder compositions of the present invention are solid masses having softening points, as measured by the ball and ring method, between about 50° C. and 130° C., preferably between about 70° and 100° C., and exhibiting a hydroxyl index between about 40 and 200. The epoxy resins of the invention are known condensation products of a diphenol such as 2,2-(4-hydrophenyl)-propane and an epihalohydrine, such as epichlorohydrine, and are prepared by known processes. These epoxy resins are generally solid masses, having melting points, as measured by the ball and ring method, between about 50° to 120° C., and epoxy indices between about 400 and 1500.

The cross-linking agents used in the composition of the present invention are compounds possessing groups which react with the active groups of the aforementioned resin components. When saturated polyester resins having hydroxyl functions as defined above are used as the constituent resins of the composition, the corresponding cross-linking agent will have acid anhydride and/or acid functions. These cross-linking agents may be prepared by the reaction of a compound containing at least one acid anhydride function and at least one carboxyl function or, alternately, at least three carboxyl functions in which at least two are capable of forming an acid anhydride, such as, tricarballylic acid, trimellitic anhydride, pyromellitic anhydride, pyromellitic dianhydride, butane tetracarboxylic acid, with an aliphatic diol containing 2 to 10 carbon atoms. Examples of such cross-linking agents are described in French Patent Application No. 75.42685. When trimellitic anhydride is used as the reactive compound in the preparation of the cross-linking agent, the molar ratio of the trimellitic anhydride to the aliphatic diol may vary from about 2/1 to 2/1.5. The reaction of the trimellitic anhydride is performed at a temperature between about 180° and 250° C. until dehydration ceases. The product of the reaction comprises a mixture of the dianhydride with ester functions and products with acid functions. The softening point of the reaction product is between about 70° and 130° C. and preferably between about 80° and 110° C. It should be understood that the reactivity of the cross-linking agent will vary according to the molar ratio of the components used to prepare the cross-linking agent.

When epoxy resins are used as the resin component of the composition of the present invention, the corresponding cross-linking agent possesses acid anhydride and/or acid functions as defined above.

The reactivity or kinetics of the binder composition of the invention is measured by means of a mechanical spectrometer operating in shear, such as the instrument of Rheometrics, Inc., Model RMF 7220, functioning in an isothermal enclosure. In this measurement, the rheological behavior of a resin/cross-linking agent powder system is recorded in a G' diagram (dyne/cm$^2$) as a function of time (in minutes), wherein G' expresses the elastic modulus of the system.

FIG. 1 displays representations of such rheological behavior measured in an isothermal enclosure at 200° C., with the aid of the aforedescribed instrument, the O point being the point of the coalescence of the grains, and the slopes of the rectilinear parts of the dG'/dt curves expressing the velocities of the cross-linking of the systems in question. For further details of this measurement technique, see M. J. Hannon, D. Rhum and K. F. Wissbrun, Journal of Coatings Technology, Vol. 48, No. 621, October 1976, pp. 42–54.

In FIG. 1, Curve A represents a strongly reactive system comprising a saturated resin and a cross-linking agent. In the case of a resin containing a hydroxyl function and cross-linking agent containing acid anhydride and acid functions, the total -COOH/OH ratio is substantially equal to 1. The term "total -COOH" expresses the sum of the -COOH functions present in the cross-linking agent and those generated from the anhydride functions. The slope of the rectilinear part of the latter generally being of the order of $10^5$ dynes/cm$^2$/minute. Curve B represents a system of intermediate reactivity and the Curce C represents a system of low reactivity comprising a saturated cross-linking resin and a cross-linking agent. In the case of a resin possessing a hydroxyl function and a cross-linking agent with acid anhydride and acid functions, this system has a total -COOH/OH ratio comprised between about 1.5 and 4, and a slope of the rectilinear part generally of the order of $10^3$ dynes/cm$^2$/minute.

Thus, in terms of reactivity, the composition of the present invention comprises (a) a first system of high reactivity comprising a reactive resin and the cross-linking agent which in a weight ratio such that the total -COOH/OH ratio is essentially equal to 1, wherein the term "total -COOH" expresses the -COOH functions present in the cross-linking agent and of those generated from anhydride functions, exhibit a curve on a mechanical spectrometer in an isothermal enclosure of 200° C., having the slope of which in its rectilinear part is between about $0.5 \times 10^5$ and $10^6$ dynes/cm$^2$/minute, and (b) a second system of low reactivity comprising a resin less reactive with respect to the same cross-linking agent which, in a weight ratio such that the total -COOH/OH ratio is comprised between about 1.5 and 4, have a curve on the mechanical spectrometer, the slope of which in its rectilinear fraction is between about $10^3$ and $6 \times 10^3$ dynes/cm$^2$/minute and preferably less than about $10^4$ dynes/cm$^2$/minute.

As nonlimiting examples of cross-linking systems representative of the family of systems illustrated by the curve A of FIG. 1, there can be mentioned a saturated cross-linking polyester resin with hydroxyl functions, having a hydroxyl index between about 175 and 185, and a cross-linking agent with acid anhydride and acid functions, having an acid index in aqueous media of about 463 and an acid index in alcohol media of about 284, prepared via the reaction of trimellitic anhydride and ethylene glycol in a ratio of about 2/1.25. In this exemplary system, the ratio of the two reactive ingredients, with respect to the total of the -COOH and OH, is essentially stoichiometric. As nonlimiting examples of cross-linking systems representative of the family of systems illustrated by the curve C of FIG. 1, there can be mentioned systems comprising a saturated, cross-linking polyester resin with hydroxyl functions, having a hydroxyl index between about 60 and 40 and a cross-linking agent. The ratio of the cross-linking agent to the polyester is such that the total -COOH/OH ratio is essentially equal to 3.8.

The weight ratio of the highly reactive resin to the low reactive resin may vary within broad limits, and may be selected to achieve a particular type of surface when used in conjunction with the cross-linkable coating. However, in general, the ratio is between about 0.5 and 2. The weight ratio of the cross-linking agent to the total of the two resins present in the compositions of the present invention is such that there exists at least essentially, a stoichiometric equilibrium between the reactive functions of the resins and of the cross-linking agent. Nevertheless, in order to develop more favorable mechanical properties in systems of hydroxylated resins and cross-linking agents with acid anhydride functions, a stoichiometric excess of the cross-linking agent is preferably used, said excess extending as high as a total -COOH/OH ratio preferably between about 1.2 and 1.6.

The compositions of the present invention are cross-linkable by means of polyaddition and/or polycondensation at temperatures between about 160° and 220° C. during periods of time varying between about 5 and 40 minutes. The formulations for powder coatings containing the compositions of the present invention usually contain conventional additives well known in the coating industry, such as fillers, pigments, and colorants. Spreading agents, such as acrylic polymers and silicon oils, may also be incorporated in the coating composition. The coating compositions may be prepared by three alternative methods. In the first, two mixtures are prepared separately. One mixture comprises the first resin, the cross-linking agent and coating additives. The other mixture contains the second resin, the cross-linking agent and coating additives. Each of these mixtures is prepared by fusion in a conventional mixer such as a Banbury or Buss mixer at a temperature which generally does not exceed 120° C. Subsequently, each mixture is cooled, finely ground to particle sizes of 20 to 100 microns, then screened. Then, the appropriate amounts of the two powders are dry mixed by means of a branched blender to obtain a composition ready for use. In the second method, the two saturated resins, in the appropriate proportions, are homogeneously blended in the dry state. During the preparation of the coating, the cross-linking agent and the additives are added as dry components to the resins. Blending by fusion is then performed, followed by grinding and screening. In the third method, which is the most economical, the components of the binder composition are present in the form of coarse powders and the additives and fillers are intimately mixed by fusing the binder in a conventional mixer, such as a Banbury or Buss blender, at a temperature generally not in excess of 120° C. The mixture is then cooled and finely ground to a particle size in the order of 20 to 100 microns and screened. The resulting mixtures are applied by known processes, such as fluidized bed, electrostatic powder coating on heat resistant degreased materials, such as metallic or ceramic pieces, then cross-linked at temperatures of about 160° to 220° C. for about 4 to 40 minutes. The average thickness of the coating obtained on the support is generally between about 30 and 70 microns.

The coating compositions of the present invention yield cross-linked coatings having a non-glossy surface. The gloss of coatings is measured by means of the reflection of incident light. It is expressed by the ratio in percent of the intensity of the reflected light, in the normal direction of reflection, to the intensity of the incident light at an angle of 60°, with the aid of a reflection apparatus of Gardner Laboratories. A gloss of 0% is equal to that of a black body and a gloss of 94% is equal to that of opaline. The compositions of the present invention yield coatings having surfaces with a gloss between about 10 and 60%, more particularly between about 25 and 45%. The surface of the coating displays a morphology different from what is currently called in the technique the phenomenon of "orange peel", which is due to poor stress conditions in the film. In comparison, coatings of the prior art employing a simple resin-cross-linking agent system as the binder, but not the dual system of the present invention, with other conditions being equal, have gloss values between about 75 and 95% in a white tone, with said gloss potentially declining to about 65% in the case of orange peel and of poor stress conditions in the coating film, the surface being of a curled appearance.

In order to illustrate the invention more clearly, the examples following hereinafter are presented. While they are representative of the invention, they do not limit it. Parts are expressed by weight, except as otherwise indicated.

EXAMPLE 1

A—Table I presents the molar compositions of the different resins used, their acid and hydroxyl indices and their melting points.

TABLE I

| | COMPOSITIONS AND CHARACTERISTICS OF POLYESTER RESINS USED | | | | | | | |
|---|---|---|---|---|---|---|---|---|
| | COMPONENTS (in moles) | | | | | Characteristics of resins | | |
| RESINS | Terephthalic acid | Propylene glycol | Neopentyl glycol | Trimethylol propane | Pentaerythritol | Acid index | Hydroxyl index | Melting point (°C.) |
| C | 1 | 1.15 | | | 0.15 | ≦5 | 180 | 85 |
| D | 1 | | 1 | 0.07 | | ≦5 | 50 | 101 |

The resins were prepared in a known manner by means of the reaction of the components at 200° C. under a nitrogen atmosphere until the desired indices were obtained. Subsequently, the resins were continuously cast onto a cooled metal strip to a thickness of 4 mm and then coarsely ground.

B—Preparation of a cross-linking agent with anhydride functions.

A cross-linking agent was prepared from the components listed below:

TABLE II

| COMPOSITION OF THE ANHYDRIDE CROSS-LINKING AGENT | |
|---|---|
| Trimellitic anhydride | 2 moles |
| Ethylene glycol | 1.25 mole |

Initially, 384 g trimellitic anhydride was introduced in a reactor flushed with nitrogen and heated to 230° C., then gradually 77.5 g ethylene glycol was introduced while maintaining the temperature of the reactor by means of external cooling. Two hours after the termination of the addition, no more water was being released. The products were cast, cooled and ground. The acid indices obtained were as follows:

TABLE III

| CHARACTERISTICS OF THE ANHYDRIDE CROSS-LINKING AGENT | |
|---|---|
| $I_A$ in an aqueous medium | 463 |
| $I_A$ in an alcohol medium | 284 |
| Melting point (ball and ring) | 100° C. |

C—Control of the resin/cross-linking agent system. Binder systems comprising in parts by weight:

| | System 1 | System 2 |
|---|---|---|
| Resin C | 100 parts | 0 parts |
| Resin D | 0 parts | 100 parts |
| Cross-linking agent | 40 parts | 22 parts |

These powder mixtures were homogenized by means of extrusion, then cooled and finely ground. The reactivity of the systems was then measured with the aid of the Rheometrics instrument described in the specification. The respective slopes of the G'=f(t) curves in their rectilinear sections were as follows:

System 1, high reactivity $0.8 \times 10^5$ dynes/cm$^2$/minute
System 2, low reactivity $0.04 \times 10^5$ dynes/cm$^2$/minute D—Preparation of Powder Coatings.

Powder coating compositions were prepared from the compounds indicated in Table IV.

TABLE IV
COMPOSITIONS BY WEIGHT FOR COATINGS

| Components | Composition 1 | Composition 2 |
|---|---|---|
| Resin C | 50 parts | 50 parts |
| Resin D | 50 parts | 50 parts |
| Cross-linking agent | 31 parts | 40 parts |
| TiO$_2$ rutile* | 50 parts | 50 parts |
| Spreading agent** | 2 parts | 2 parts |
| ZnO | 1 part | 1 part |

*Rutile, titanium oxide - Kronos CL 220, marketed by the Societe Industrielle du Titane (Titanium Industrial Company)
**Acronal 4 F, marketed by the BASF Company.

An intimate mixture of the powder components was obtained and extruded on a Buss mixer at a temperature of 100° C. The mixture was cooled and finely ground, then screened through a sieve with 100 micron mesh openings.

The resulting powder was applied by means of a spectrostatic gun (SAMES) to a steel plate (previously degreased), having dimensions of 20 cm × 10 cm × 0.08 cm. The plate was then heated at 200° C. for 25 minutes. After cooling, the following properties of the coating film were measured:

Impact resistance: measured by NFT (French National) Standard 30039
Erichsen cup test: measured by NFT Standard 30019
ASTM bend test: measured by ASTM D 522-60
Persoz hardness (seconds): measured by NFT 30016 Standard
Persoz hardness after solvent exposure. Persoz hardness was measured following immersion of the specimen in trichloroethylene (symbol o) and methylethylketone (symbol O) for a period of 1 hour.
MEK test: a drop of methylethylketone was placed on the coating, the location was rubbed by the fingernail and the time required to remove the coating recorded in minutes.
Gloss: gloss was measured by means of the Gardner Laboratories instrument under incident light at 60°, expressed as the reflected intensity with respect to the incident light (in percents) (ASTM Standard D 523). Results appear in Table V.

TABLE V
PROPERTIES OF COATINGS

| Composition | Thickness in μ | Erichsen cup test | Impact strength | ASTM bend test Elongation % | ASTM bend test φ mm | Persoz- hardness | MEK test | Gloss % |
|---|---|---|---|---|---|---|---|---|
| Composition 1 | 50 | 9 | >100 | >32 | <3 | 280 | >3 | 40 |
| Composition 2 | 50 | 9 | >100 | >32 | <3 | 280 | >3 | 30 |

Comparative Example 1

In this example, compositions according to the following table were used:

TABLE

| | Composition 3 | Composition 4 |
|---|---|---|
| Resin C | 100 parts | 0 part |
| Resin D | 0 part | 100 parts |
| Cross-linking agent | 40 parts | 20 parts |
| TiO$_2$ rutile | 50 parts | 50 parts |
| Acronal 4 F | 2 parts | 2 parts |
| ZnO | 1 part | 1 part |

The coating compositions were prepared and applied as in Example 1. The gloss displayed by the coatings prepared by the compositions was, respectively, 85% (Composition 3) and 80% (Composition 4).

While the invention has now been described in terms of certain preferred embodiments, and exemplified with respect thereto, the skilled artisan will readily appreciate that various modifications, changes, omissions and substitutions may be made without departing from the spirit thereof. It is intended, therefore, that the present invention be limited solely by the scope of the following claims.

What is claimed is:

1. A binder composition for use in powder coatings comprising
at least two saturated cross-linking resins wherein said at least two saturated cross-linking resins comprise resins selected from the group consisting of saturated polyester and epoxy resins, and
a cross-linking agent,
said resins exhibiting different reactivities with respect to said cross-linking agent such that a system comprising the most highly reactive resin and the cross-linking agent, with said system having a weight ratio of cross-linking agent/resin such that there is stoichiometric equilibrium, exhibits a curve on a mechanical spectrometer in an isothermal enclosure at 200° C. having a slope, in its rectilinear part, that is between $0.5 \times 10^5$ and $10^6$ dynes/cm$^2$/minute, and that a system comprising the lesser reactive resin and the cross-linking agent, same having a weight ratio of cross-linking agent/resin such that the ratio of the reactive functions of the cross-linking agent to those of the resin is between about 1.5 and 4 times the stoichiometric ratio, exhibits a curve on a mechanical spectrometer in an isothermal enclosure at 200° C. which has a slope, in its rectilinear part, that is between about $10^3$ and $6 \times 10^3$ dynes/cm$^2$/minute.

2. The composition of claim 1 wherein said slope exhibited by the less reactive resin/cross-linking agent system is less than about $10^4$ dynes/cm$^2$/minute.

3. The composition of claim 1 wherein the weight ratio of the resin exhibiting the higher reactivity toward the cross-linking agent to the lower reactive resin is in the range of about 0.5 to 2.

4. The composition as defined by claim 1, wherein said saturated polyester resins are prepared by the reaction of at least one aromatic dicarboxylic acid or the lower alkyl ester thereof with at least one diol.

5. The composition as defined by claim 4, wherein said saturated polyester resins are solid masses having melting points between about 50° and 130° C. and exhibiting an acid index less than about 10.

6. The composition as defined by claim 4, wherein at least one saturated aliphatic acid or aromatic acid having a functionality greater than 2 is combined with said at least one aromatic dicarboxylic acid or lower alkyl ester thereof.

7. The composition as defined by claim 4, wherein at least one polyol having a functionality greater than 2 is combined with said at least one diol.

8. The composition as defined by claim 1, wherein said epoxy resins are solid masses having melting points between about 50° and 120° C. and epoxy indices between about 400 and 1500.

9. The composition as defined by claim 1, wherein said cross-linking agent contains acid anhydride or acid functions.

10. The composition as defined by claim 9, wherein said cross-linking agent is prepared by the reaction of a compound containing at least one acid anhydride function and at least one carboxyl function with an aliphatic diol containing from 2 to 10 carbon atoms.

11. The composition as defined by claim 10, wherein said cross-linking agent is prepared by the reaction of trimellitic anhydride with the aliphatic diol at a temperature between about 180° and 250° C. in which the ratio of trimellitic anhydride to diol is between about 2:1 to 2:1.5.

12. The composition as defined by claim 11, wherein said cross-linking agent is the product of the reaction of trimellitic anhydride and ethylene glycol.

13. The composition as defined by claim 1, wherein the weight ratio of the cross-linking agent to the saturated cross-linking resins is such that the total —COOH ratio is greater than 1.

14. The composition as defined by claim 13, wherein said ratio is between about 1.2 and 1.6.

15. A powder coating composition comprising the binder as defined by claim 1.

16. The coating composition as defined by claim 15, further comprising coating additives selected from the group consisting of fillers, pigments, colorants, spreading agents and mixtures thereof.

17. A binder composition for use in powder coatings comprising at least two saturated cross-linking polyester resins and a cross-linking agent, said resins exhibiting different reactivities with respect to said cross-linking agent wherein the resin exhibiting the highest reactivity has a hydroxyl index between about 175 and 185 and the resin exhibiting the lowest reactivity has a hydroxyl index between about 40 and 60.

18. The composition of claim 17, wherein the weight ratio of the highest reactive resin to the lowest reactive resin is in the range of about 0.5 to 2.

19. The composition as defined by claim 17, wherein said saturated polyester resins are prepared by the reaction of a least one aromatic dicarboxylic acid or the lower alkyl ester thereof with at least one diol.

20. The composition as defined by claim 19, wherein said saturated polyester resins are solid masses having melting points between about 50° and 130° C. and exhibiting an acid index less than about 10.

21. The composition as defined by claim 19, wherein at least one saturated aliphatic acid or aromatic acid having a functionality greater than 2 is combined with said at least one aromatic dicarboxylic acid or lower alkyl ester thereof.

22. The composition as defined by claim 19, wherein at least one polyol having a functionality greater than 2 is combined with said at least one diol.

23. The composition as defined by claim 17, wherein said cross-linking agent contains said anhydride or acid functions.

24. The composition as defined by claim 23, wherein said cross-linking agent is prepared by the reaction of a compound containing at least one acid anhydride function and at least one carboxyl function with an aliphatic diol containing from 2 to 10 carbon atoms.

25. The composition as defined by claim 24, wherein said cross-linking agent is prepared by the reaction of trimellitic anhydride with said aliphatic diol at a temperature between about 180° and 250° C. in which the ratio of trimellitic anhydride to diol is between about 2:1 to 2:1.5.

26. The composition as defined by claim 25, wherein said cross-linking agent is the product of the reaction of trimellitic anhydride and ethylene glycol.

27. The composition as defined by claim 17, wherein the weight ratio of the cross-linking agent to the saturated cross-linking resins is such that the total —COOH/OH ratio is greater than 1.

28. The composition as defined by claim 27, wherein said ratio is between about 1.2 and 1.6.

29. A powder coating composition comprising the binder as defined by claim 17.

30. The coating composition as defined by claim 29, further comprising coating additives selected from the group consisting of fillers, pigments, colorants, spreading agents and mixtures thereof.

31. A process for the preparation of a powder coating comprising mixing the binder composition of claim 1 or 17, together with coating additives selected from the group consisting of fillers, pigments, colorants, spreading agents and mixtures thereof, at a temperature less than about 120° C. to fuse the components, cooling the fused mixture, grinding the cooled mixture and screening the ground powder.

* * * * *